United States Patent Office 2,695,225
Patented Nov. 23, 1954

2,695,225
HERBICIDAL COMPOSITIONS

Eugene D. Witman, Pittsburgh, Pa., assignor to Columbia-Southern Chemical Corporation, Allegheny County, Pa., a corporation of Delaware No Drawing. Application May 21, 1954,
Serial No. 431,569

19 Claims. (Cl. 71—2.4)

This invention relates to isopropyl N-3-chlorophenyl carbamate, and it has particular relation to the use of isopropyl N-3-chlorophenyl carbamate as a herbicide. In accordance with this invention, novel herbicidal compositions containing isopropyl N-3-chlorophenyl carbamate as the active ingredient thereof and novel methods of killing weeds using isopropyl N-3-chlorophenyl carbamate have been provided.

Isopropyl N-3-chlorophenyl carbamate may be prepared by the reaction of an isopropyl haloformate, such as isopropyl chloroformate, and meta-chloroaniline, usually in the presence of a base such as an alkali metal hydroxide, carbonate, and/or bicarbonate. The reaction is carried out at a temperature above the freezing point of the reaction mixture but below 10 to 15° C., usually 0 to 10° C.

A preferred method of procedure is to add isopropyl chloroformate to a mixture of meta-chloroaniline and the base, employing substantially one mol of each reactant. Equally good results are obtained, however, when an excess, for example, up to 100 per cent or more by molar ratio, of meta-chloroaniline is used or when any organic tertiary amine is used as the HCl acceptor. When an excess of meta-chloroaniline is used, a correspondingly smaller amount of base may be used. The reaction may also be performed by adding the base to a mixture of meta-chloroaniline and isopropyl chloroformate.

Various basic compounds may be employed in the reaction. Inorganic bases such as the oxides, hydroxides, carbonates and bicarbonates of sodium, potassium, calcium, barium, strontium, and magnesium or other alkaline earth metal or alkali metal; organic bases such as pyridine, dimethyl aniline, and quaternary ammonium bases such as trimethyl phenyl ammonium hydroxide are included among those bases which may be employed in the reaction.

An example of the reaction is as follows:

EXAMPLE I

Five mols (638 grams) of meta-chloroaniline was placed in a three-liter, three-necked, reaction flask equipped with a thermometer and nickel stirrer and stirred and cooled to 5° C. Five mols (612.5 grams) of isopropyl chloroformate and 5.25 mols (840 grams) of an aqueous solution of sodium hydroxide containing 25.5 per cent by weight of sodium hydroxide were added simultaneously over a three-hour period while maintaining a reaction temperature of 0 to 10° C. Stirring of the reaction mixture was continued for one hour after the addition was completed. Five hundred milliliters of benzene was added to effect a separation of the organic layers. The resulting benzene solution containing the product was washed twice with dilute hydrochloric acid and water. After drying the benzene solution over anhydrous sodium sulfate for 16 hours, the solution was filtered and distilled at a temperature of 140° C. at a pressure of 10 millimeters of mercury to give 1016.7 grams of isopropyl N-3-chlorophenyl carbamate. The product is a colorless viscous liquid which crystallizes slowly on standing at temperatures slightly below room temperature. It boils at 149° C. at two millimeters of mercury pressure, and has a melting point of 40.7 to 41.1° C. It has an index of refraction of $n^{20}_D$ 1.5388 and is readily soluble in acetone, xylene, toluene, ethyl alcohol, etc., but insoluble in water.

Isopropyl N-3-chlorophenyl carbamate has been found to be valuable for use as a herbicide, particularly for killing weeds and like broad leaf plants. It was subjected to a standard cucumber germination test and compared with the sodium salt of 2,4-dichlorophenoxyacetic acid, a compound having known acceptable herbicidal activity. The germination test employed and the results obtained therefrom are described below:

Germination test

Solutions containing 10 parts per million of isopropyl N-3-chlorophenyl carbamate and 10 parts per million of the sodium salt of 2,4-dichlorophenoxyacetic acid were prepared. The 10 parts per million solution of isopropyl N-3-chlorophenyl carbamate was prepared by dissolving 10 milligrams of the compound in 50 milliliters of ethyl alcohol and diluting to one liter with distilled water. The 10 parts per million solution of the sodium salt of 2,4-dichlorophenoxyacetic acid was prepared by diluting 10 milligrams of the sodium salt to one liter with distilled water. Distilled water was used as the control during the germination period.

Cucumber seeds (Improved White Spine variety) were placed on a piece of filter paper in four-inch Petri dishes. Five milliliters of each solution were added and the Petri dishes were then covered. Germination was allowed to occur in the dark for 90 hours at 30° C. The length of the primary root was then measured. The relative herbicidal activity is shown in the table below:

Table

| Compound | Average Length of Primary Root (Millimeters) | Relative Herbicidal Activity, Percent |
|---|---|---|
| Sodium salt of 2,4-dichlorophenoxyacetic acid | 4.8 | 100 |
| Isopropyl N-3-chlorophenyl carbamate | 9.2 | 91.4 |
| Control (distilled water) | 56.1 | 0 |

The relative herbicidal activity of isopropyl N-3-chlorophenyl carbamate was calculated based upon the control (distilled water) as the greatest amount of germination and compared to the amount of germination with the sodium salt of 2,4-dichlorophenoxyacetic acid arbitrarily assigned as 100 per cent inhibition of growth. It can readily be seen that the herbicidal activity of isopropyl N-3-chlorophenyl carbamate approximates the activity of the sodium salt of 2,4-dichlorophenoxyacetic acid.

Using the same procedure, the inhibition of isopropyl N-3-chlorophenyl carbamate to the germination of corn seed was determined. The relative inhibition of isopropyl N-3-chlorophenyl carbamate was 80.3 per cent as compared to 100 per cent inhibition by the sodium salt of 2,4-dichlorophenoxyacetic acid.

Isopropyl N-3-chlorophenyl carbamate may be formulated for use as a herbicide in either liquid or solid formulations. Isopropyl N - 3 - chlorophenylcarbamate may be prepared as a liquid formulation by dissolving it with a suitable hydrocarbon solvent, such as xylene, toluene, gasoline, kerosene or other hydrocarbons having a density lower than that of water; or with alcohols, ethers, ketones, and esters containing up to about 10 carbon atoms which are commonly used as industrial solvents, such as ethyl alcohols, methyl alcohol, isopropyl alcohol, butyl alcohol, ethyl ether, acetone, etc. The concentration of solvent added varies from 2 or 3 per cent to 80 or 90 per cent by weight of the final formulation, depending in part upon the degree of temperature stability required.

The extent of addition of solvent to isopropyl N-3-chlorophenyl carbamate is limited by the solubility of the solvent and isopropyl N-3-chlorophenyl carbamate at the temperature at which stability is desired. Thus, at room temperature, 20° C., a solution of about 10 per cent by weight of isopropyl N-3-chlorophenyl carbamate and 90 per cent by weight of kerosene makes a perfect solution, but any decrease in the concentration of kerosene results in a two-phase system which is unacceptable. One the other hand, xylene and isopropyl N-3-chlorophenyl carbamate are miscible in all proportions and any desired concentration of isopropyl N-3-chlorophenyl carbamate in xylene may be used.

A surface active or wetting agent is generally added to the solvent and isopropyl N-3-chlorophenyl carbamate to produce an emulsifiable system. Suitable wetting agents are sodium alkylaryl sulfonates, sulfonated dicarboxylic acid esters such as dioctyl sodium sulfosuccinate, alkyl naphthalene sulfonic acids, etc. Such an emulsifiable system may be mixed with water to form an aqueous dispersion containing about 0.1 to 5.0 per cent by weight of isopropyl N-3-chlorophenyl carbamate which is applied to weeds as a spray by use of highly specialized low-gallonage sprayers or conventional sprayers. The concentration of the wetting agent is usually between 10 to 30 per cent by weight of the solvent and isopropyl N-3-chlorophenyl carbamate, depending upon the amount necessary to obtain an emulsion.

An example of an acceptable formulation is as follows:

| | Pounds |
|---|---|
| Isopropyl N-3-chlorophenylcarbamate | 3.42 |
| Xylene | 3.22 |
| Isopropyl alcohol | 0.26 |
| Polyoxyethylene sorbitol esters of mixed fatty and resin acids | 1.52 |

One of the considerations in the choice of the ingredients and concentrations thereof in the above formulation and in all formulations is the achievement of an emulsifiable system having a density substantially that of water so that when the system is mixed with water, the tiny emulsion droplets will remain well dispersed, having no tendency to rise or fall in the aqueous dispersion. A formulation comprising isopropyl N-3-chlorophenyl carbamate and a solvent therefor having a density which does not vary by more than 5 per cent of the density of water is considered to be desirable.

Consequently, the emulsion preferably should comprise water, isopropyl N-3-chlorophenyl carbamate, and an amount of solvent for the carbamate (hydrocarbon, etc. of lower density than water), the amount of the solvent being sufficient to establish the density of the mixture of the carbamate and the solvent substantially the same as the density of water ±5 per cent).

Where aqueous solutions rather than emulsions are desired, the mixture of water and carbamate should contain a water soluble solvent for the carbamate, such as an alcohol or acetone in amount sufficient to ensure solution of the ester.

Liquid formulations which are unusally heat stable are provided by dissolving isopropyl N-3-chlorophenyl carbamate in a combination of at least two different types of solvents, namely a hydrocarbon solvent such as xylene, and an organic oxygen-containing solvent, notably isopropanol. The total concentration of solvent in the ultimate formulation of the carbamate varies from 2 or 3 to 80 or 90 per cent by weight, the exact concentration being dependent upon a variety of factors including the solubility of the carbamate in the solvent system.

Provision of such duo-solvent formulations result in compositions which possess an unusually high degree of temperature stability particularly at low temperatures. Employing a combination of hydrocarbon solvent along with an organic oxygen-comprising solvent provides a medium wherein isopropyl N-3-chlorophenyl carbamate may be maintained in solution at temperatures well below 0° C., without encountering solid formation. This temperature stability is desirable.

Those liquid compositions wherein the primary solvent component is a hydrocarbon are preferred. Thus, mixtures of the two different types of solvents herein contemplated to provide the desired medium for isopropyl N-3-chlorophenyl carbamate should contain more hydrocarbon solvent than oxygen-containing solvent. When the organic oxygen-containing solvent constitutes between about 4 or 5 and 45 per cent, and preferably between 5 and 20 per cent, by weight of the total solvents comprising the formulation, a desired system is provided.

Satisfactory hydrocarbon solvents for the contemplated solvent system include those hereinbefore enumerated such as gasoline, kerosene, etc. and more particularly xylene, toluene or other alkyl benzenes, alkyl naphthalenes, e. g. methyl naphthalenes, dimethyl naphthalene, trimethyl naphthalene, ethyl naphthalene as well as commercial alkyl naphthalene mixtures such as those sold under the name "Exosol" and other hydrocarbon solvents. Of such hydrocarbon solvents, those which are aralkyl in nature, such as xylene, are preferable.

The other class of solvents employed to provide the duo-solvent system are organic oxygen-containing solvents containing preferably only carbon, hydrogen and oxygen atoms, such as alcohols, especially monohydric alcohols, ethers, esters or ketones. Aliphatic monohydric alcohols, preferably those containing from 1 to 5 carbon atoms, and more notably isopropanol, comprise a favored group of organic oxygen-containing solvents. Other oxygen-containing compounds include methanol, ethanol, the butyl alcohols, allyl alcohols, ethylene glycol, propylene glycol, ethyl ether, cellusolve, methyl acetate, ethyl acetate, acetone, methyl-ethyl ketone, methyl-ethyl ether, and other like low boiling compounds usually containing up to 10 carbon atoms, and preferably less than 5 carbon atoms.

Another example of a specific formulation is:

| | Grams |
|---|---|
| Isopropyl N-3-chlorophenyl carbamate | 454 |
| Methyl naphthalene | 458 |
| Isopropyl alcohol | 18.9 |
| Wetting agent | 113.5 |

Of course, satisfactory liquid formulations may be composed of one or more hydrocarbon solvents, and/or one or more organic oxygen-containing solvents. For economical reasons, commercial mixtures of hydrocarbon mixtures, rather than a single hydrocarbon solvent are often employed.

The respective members of the different classes of solvents employed to provide the heat stable system should necessarily be miscible with each other in the proportions they are utilized. In general, this provides little or no difficulty or limitation upon the system, most members of the respective groups being mutually miscible, in sufficient proportions with the other group.

A suitable surface active agent or wetting agent, as already described, may be incoporated in the duo-solvent system, especially when an emulsifiable system is desired which is to be diluted with water.

Isopropyl N-3-chlorophenyl carbamate may be prepared as a solid or dust formulation. Such a formulation may be prepared by spraying the carbamate onto a highly absorptive solid diluent, such as highly absorptive silica. The coated diluent is then further diluted by blending with a solid diluent, such as clay, talc, silica, bentonite, diatomaceous earth, chalk, wood flour, etc., to produce a finished dust containing about 5 to 25 per cent by weight of isopropyl N-3-chlorophenyl carbamate. The solid formulations may be made wettable by the addition of a suitable wetting agent such as described above with respect to liquid formulations. A solid formulation also may be prepared by grinding isopropyl N-3-chlorophenyl carbamate in a hammer mill with any of the above solid diluents.

This application is a continuation-in-part of application Serial No. 248,450, filed September 26, 1951, and a continuation of application Serial No. 410,441, filed February 15, 1954, both of which are now abandoned.

I claim:
1. A herbicidal composition comprising a herbicidal concentration of isopropyl N-3-chlorophenyl carbamate and a diluent therefor.
2. A herbicidal composition comprising a herbicidal concentration of isopropyl N-3-chlorophenyl carbamate and a solid pulverulent diluent.
3. A herbicidal composition comprising a herbicidal concentration of isopropyl N-3-chlorophenyl carbamate and a solvent therefor in an aqueous dispersion.
4. A herbicidal composition comprising a herbicidal concentration of isopropyl N-3-chlorophenyl carbamate and a solvent therefor, the amount of the solvent being sufficient to constitute the density of the solution of isopropyl N-3-chlorophenyl carbamate and solvent substantially the same as the density of water.
5. A herbicidal composition comprising a herbicidal concentration of isopropyl N-3-chlorophenyl carbamate and a solvent therefor in an aqueous dispersion, the amount of solvent being sufficient to constitute the density of the solution of isopropyl N-3-chlorophenyl carbamate and solvent substantially the same as the density of water.
6. A method of combating weeds which comprises treating said weeds with a herbicidal concentration of isopropyl N-3-chlorophenyl carbamate and a diluent therefor.

7. A method of combating weeds which comprises treating said weeds with an aqueous solution containing a herbicidal concentration of isopropyl N-3-chlorophenyl carbamate and a solvent therefor, the solvent being present in amount sufficient to constitute the density of iosopropyl N-3-chlorophenyl carbamate and solvent at substantially one.

8. An aqueous herbicidal composition comprising a herbicidal concentration of isopropyl N-3-chlorophenyl carbamate, a hydrocarbon solvent, said hydrocarbon solvent having a density lower than that of water, and water.

9. An aqueous herbicidal composition comprising a herbicidal concentration of isopropyl N-3-chlorophenyl carbamate, xylene, and water.

10. A herbicidal composition comprising a herbicidal concentration of isopropyl N-3-chlorophenyl carbamate and a hydrocarbon solvent, said hydrocarbon solvent having a density lower than that of water.

11. A herbicidal composition comprising a herbicidal concentration of isopropyl N-3-chlorophenyl carbamate and xylene, wherein the xylene concentration is from 2 to 90% by weight of the isopropyl N-3-chlorophenyl carbamate and xylene.

12. A herbicidal composition comprising a herbicidal concentration of isopropyl N-3-chlorophenyl carbamate, a hydrocarbon solvent and an organic oxygen-containing solvent.

13. A herbicidal composition comprising a herbicidal concentration of isopropyl N-3-chlorophenyl carbamate, a hydrocarbon solvent and an organic oxygen-containing solvent, said hydrocarbon solvent comprising a major portion by weight of the solvents present.

14. A herbicidal composition comprising a herbicidal concentration of isopropyl N-3-chlorophenyl carbamate, a hydrocarbon aralkyl solvent and an organic oxygen-containing solvent.

15. A herbicidal composition comprising a herbicidal concentration of isopropyl N-3-chlorophenyl carbamate, a hydrocarbon solvent and an aliphatic alcohol.

16. A herbicidal composition comprising a herbicidal concentration of isopropyl N-3-chlorophenyl carbamate, an aralkyl hydrocarbon solvent and an aliphatic alcohol.

17. The composition of claim 16 wherein the alcohol comprises between about 5 to 45 per cent by weight of the hydrocarbon and alcohol present.

18. The composition of claim 16 wherein the alcohol is isopropanol.

19. A herbicidal composition comprising a herbicidal concentration of isopropyl N-3-chlorophenyl carbamate, an aralkyl hydrocarbon solvent and an organic oxygen-containing solvent, said latter solvent containing only carbon, hydrogen and oxygen atoms.

References Cited in the file of this patent

UNITED STATES PATENTS

| Number | Name | Date |
|---|---|---|
| 2,453,983 | Sexton et al. | Nov. 16, 1948 |
| 2,552,187 | Kosmin | May 8, 1951 |
| 2,596,089 | Allen | May 13, 1952 |

FOREIGN PATENTS

| Number | Country | Date |
|---|---|---|
| 574,995 | Great Britain | Jan. 30, 1946 |

OTHER REFERENCES

Agricultural Chemicals, February 1951, page 37.
Science, March 17, 1950, pages 285 and 286.
"Agronomy Journal," March 1951, pages 139 and 142. (Article by H. R. de Rose, Rec'd for publication May 31, 1950.)
"Emulsions and Foams," by Berkman and Egloff, Reinhold Pub. Co. (New York) (1941), page 160.